United States Patent
Gittins

(12) 
(10) Patent No.: US 6,578,079 B1
(45) Date of Patent: Jun. 10, 2003

(54) COMMUNICATIONS NODE FOR PROVIDING NETWORK BASED INFORMATION SERVICE

(75) Inventor: Christopher J Gittins, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/171,922
(22) PCT Filed: Oct. 14, 1998
(86) PCT No.: PCT/GB98/03086
§ 371 (c)(1), (2), (4) Date: Oct. 29, 1998
(87) PCT Pub. No.: WO99/21349
PCT Pub. Date: Apr. 29, 1999

(30) Foreign Application Priority Data

Oct. 22, 1997 (EP) .............................. 97308428

(51) Int. Cl.$^7$ .............................................. G06F 15/16
(52) U.S. Cl. .................... 709/229; 709/218; 709/219
(58) Field of Search .................. 379/88.08, 93.09; 707/10; 709/217, 218, 219, 229, 203

(56) References Cited

U.S. PATENT DOCUMENTS

| | | | | |
|---|---|---|---|---|
| 5,181,238 A | * | 1/1993 | Medamana et al. ...... | 379/88.08 |
| 5,485,507 A | * | 1/1996 | Brown et al. ............. | 379/93.03 |
| 5,815,665 A | * | 9/1998 | Teper et al. ............... | 709/229 |
| 5,864,604 A | * | 1/1999 | Moen et al. ............. | 709/217 X |
| 5,884,312 A | * | 3/1999 | Dustan et al. .............. | 707/10 |
| 6,119,155 A | * | 9/2000 | Rossmann et al. .......... | 709/219 |
| 6,311,207 B1 | * | 10/2001 | Mighdoll et al. ........... | 709/203 |

FOREIGN PATENT DOCUMENTS

| | | | |
|---|---|---|---|
| EP | 0 643 541 A2 | * | 3/1995 |
| WO | 97/22212 | * | 6/1997 |

OTHER PUBLICATIONS

Ichiro Iida et al., DUET: An Agent–Based Personal Communications Network, IEEE Communications Magazine, Nov. 1995, pp. 44–49.*

* cited by examiner

Primary Examiner—Patrice Winder
(74) Attorney, Agent, or Firm—Nixon & Vanderhye P.C.

(57) ABSTRACT

A node (and method) provides a network-based information service in an intelligent communications network. The node is arranged to store customer identities, respective customer-associated lists of identities of information items for which the respective associated customer has access rights, and identities of item-associated information sources which store the respective items. It responds to a message from a customer requesting access to the information service and indicating an item which the customer wants sent to him, by ascertaining whether the requested item is in the customer's list, and, if so, retrieving the item from its respective source, and sending it to the customer. If the message does not contain an item identity, the list of items is sent to the customer for him to make a selection.

27 Claims, 3 Drawing Sheets

COMMUNICATIONS NODE FOR PROVIDING NETWORK BASED INFORMATION SERVICE

BACKGROUND OF THE INVENTION

1. Field of the Invention

This invention relates to a node for use in an intelligent communications network for providing a network-based information service, and to a method of operating an intelligent communications network to provide such a service.

2. Related Art

In the last few years there has been a considerable increase in the number of documents that are in electronic form and are made available by various Information Service Providers, with or without charge, to the public via the World Wide Web. As an example, many newspapers are now in electronic form and can be viewed by download from the Information Service Provider's website.

Where an Information Service Provider charges for access to documents (herein referred to as information items, or just items), the manner of charging can vary from Provider to Provider, and also from document to document. Before a person is granted access rights he has to execute an agreement with the Provider, under which he usually has to pay a periodic subscription fee (e.g. monthly, quarterly, or annual), and this may allow unlimited access to all the items retrievable from the Provider. If unlimited access is not given, there may be a charge based on the number of items accessed (retrieved) by the person, or the charge may be on an item basis, with some documents carrying a higher charge than others depending upon the commercial worth accorded to the documents by the Provider.

Furthermore, for each item that a person wishes to have access to, a separate access procedure (logon to the Provider) has to be performed, including providing a personal identification number (PIN). It can therefore be seen that where the number of items is greater than just a few, the proliferation of separate agreements, separate bills, separate logon procedures and PINs can be burdensome for that person, especially if they have to be changed at intervals and these intervals are not synchronised between the various Providers.

U.S. Pat. No. 5,181,238 (Medamana et al.) discloses arrangements for providing pre-authenticated access from a caller to a service provider. The caller dials the number of the service provider and subsequently enters a personal identification number (PIN) or other suitable authentication data, and, if necessary, an account number. A data base in the communications carrier verifies that the caller has been authorised to access the service provider and that the PIN is correct for that caller and forwards the cal to the service provider only if both checks are satisfied. Only preauthenticated calls are delivered to the service provider, and the caller need only remember one PIN for all the service providers accessed by this arrangement.

SUMMARY OF THE INVENTION

According to a first aspect of the present invention there is provided a node for providing an information service in an intelligent communications network, the node comprising:

data storage means for storing customer identities, respective customer-associated lists of identities of information items, hereinafter referred to as items, for which the respective associated customer has access rights, and identities of item-associated information sources which store the respective items;

means for accessing the data storage means;

signalling means for receiving and transmitting messages;

means for reading an access request message received by said signalling means and providing at least a customer identity extracted therefrom; and control means responsive to the provision by said reading means of a customer identity not accompanied by an item identity to retrieve, via said accessing means, a customer-associated list corresponding to said customer identity and to send a message including said retrieved list to the customer via said signalling means, and to the provision by said reading means of an item identity received in a reply message from the customer to retrieve, via said accessing means, the corresponding information source identity, to retrieve the requested item from the corresponding information source, and to send a message including at least the first page of the retrieved item to the customer via said signalling means.

According to a second aspect of the present invention there is provided a node for providing an information service in an intelligent communications network, the node comprising:

data storage means for storing customer identities, respective customer-associated lists of identities of information items, hereinafter referred to as items, for which the respective associated customer has access rights, and identities of item-associated information sources which store the respective items;

means for accessing the data storage means;

signalling means for receiving and transmitting messages;

means for reading a message received by said signalling means and providing at least a customer identity and an item identity extracted therefrom;

comparison means; and control means responsive to the provision by said reading means of a customer identity and an item identity received in an access request message from a customer to retrieve, via said accessing means, a customer-associated list corresponding to said customer identity and to provide to said comparison means said item identity and the retrieved list, and to an indication provided by the comparison means of a match between said received item identity and a member of the retrieved list to retrieve, via said accessing means, the corresponding information source identity, to retrieve the requested item from the corresponding information source, and to send a message including at least the first page of the retrieved item to the customer via said signalling means.

An operator of an intelligent communications network incorporating a node of the present invention can make a single agreement with a customer for the provision of all the customer's information service needs, whereby the customer has a single bill for all his accesses and makes a single payment, the customer has a single network number to dial for access to all his information services, and the customer can readily manage his list of items, by adding to it or deleting from it.

According to a third aspect of the present invention there is provided a method of operating an intelligent communications network to provide a network-based information service, the method comprising the following steps:

step a—storing customer identities, respective customer-associated lists of identities of information items, hereinafter referred to as items, for which the respective associated customer has access rights, and identities of item-associated information sources from which the respective items can be retrieved;

step b—receiving at the network a message requesting access to the information service and comprising at least a customer identity;

step c—reading the contents of the received message;

step d—retrieving from storage the list of information item identities associated with the received customer identity;

if no item identity is received in step b, step e1—sending said list to the customer; and step e2—reading an item identity from a further message received from the customer;

or, on the other hand, if an item identity is received in step b, step f—ascertaining whether or not that received item identity is in said list;

and for such item identity received in step b, if it is ascertained in step f that said received item identity is in said list, or, alternatively, for the item identity received in step e2, as the case may be.

step g—ascertaining the identity of the information source associated with that received item identity:

step h—retrieving the requested item from that information source; and step i—sending at least the first page of the retrieved item to the customer.

BRIEF DESCRIPTION OF THE DRAWINGS

A specific embodiment of the present invention will now be described by way of example with reference to the drawings in which.

DETAILED DESCRIPTION OF EXEMPLARY EMBODIMENTS

Figure 1:
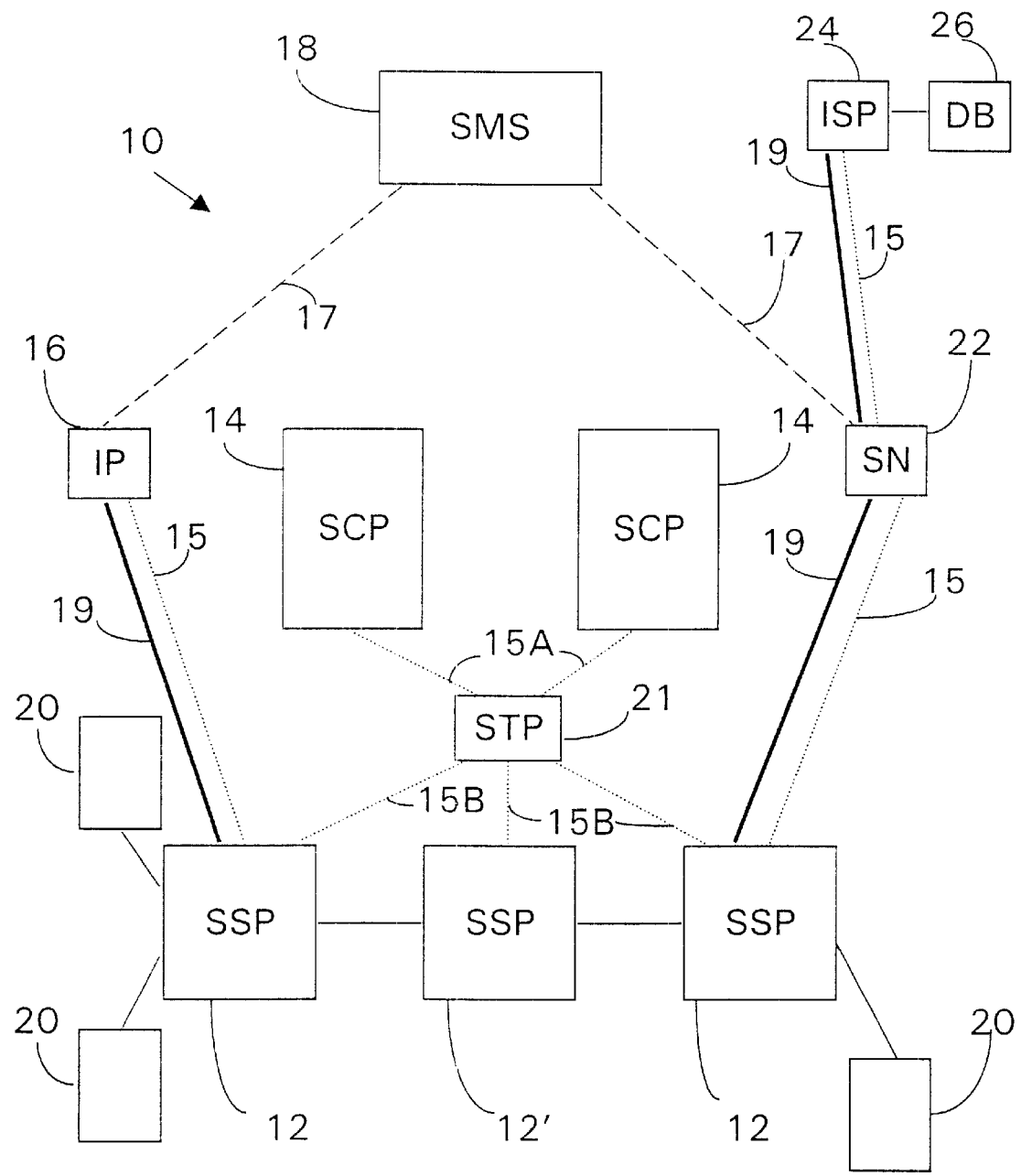
FIG. 1 is a schematic diagram of the structure of an intelligent network incorporating a service node of the present invention.

In FIG. 1, there is shown an intelligent network (IN) 10 comprising a plurality of service switching points (SSPs) 12, a plurality of service control points (SCPs) 14, only two of which are shown, a plurality of intelligent peripherals (IPs) 16, only one of which is shown, a plurality of service nodes (SNs) 22, only one of which is shown, a service management system (SMS) 18, and a plurality of signalling transfer points (STPs) 21, only one of which is shown. As is known, some of the SSPs 12 act as local exchanges and are connected to a plurality of network terminals 20 via a local access network, not shown, and some of the SSPs 12', only one of which is shown, act as trunk exchanges.

For information on intelligent networks in general the reader is referred to BT Technology Journal Vol.13 No.2 April 1995, the theme of which is network intelligence.

Each STP 21 is coupled to a respective plurality of SCPs 14 via a respective network signalling link 15A shown in dotted line, and is coupled to a respective plurality of SSPs 12 via respective network signalling links 15B shown in dotted line. Each IP 16 is coupled to the SMS 18 via an operational command link 17, and to a respective one of the SSPs 12 via a network signalling link 15, and a traffic data link 19 shown in continuous thick line. Each SN 22 is coupled to the SMS 18 via an operational command link 17, and to a respective one of the SSPs 12 via a network signalling link 15, and a traffic data link 19. In variants one or more of the SNs 22 are coupled to a plurality of the SSPs 12.

Each SN 22 is similarly coupled, by links 15 and 19, to each of a plurality of remote information service providers (ISPs) 24, only one of which is shown, for access to its database 26. Although the SN 22 is shown as having a direct connection (links 15 and 19) to the ISP 24, in practice this connection might be via another communications network, for example the Public Switched Telephone Network, the Integrated Services Digital Network, or the Internet, and the ISP 24 does not have to be situated in the same country as the IN 10, but can be situated anywhere where it can be reached via a communications facility.

Each ISP 24 has an agreement with the operator of the IN 10 to provide access to its respective information source. It will be appreciated that there is no fixed format for these information sources. In some cases the information source will be in the form of a single item, also referred to herein as a document, comprising a number of pages, and the customer's information request will be satisfied by the download of one or more pages of this single document to the customer's terminal or device. In other cases the information source will be in the form of linked items, such as in a tree structure, also known as a menu structure, and the customer will be able to move down through the menu by sending his item selection to the SN 22.

In this embodiment the customer uses a personal digital assistant (PDA) having a communications facility to access the information service. Such a device is also known as a personal communicating computer (PCC), and will be referred to hereinafter as a PCC.

Where items are linked, as mentioned above, a downloaded page displays the available options with respective alphabetical identifiers, and the customer will send a Next Item message by pressing a Next Page button, which is soft programmed to provide this Next Item function, and be prompted via a screen display to enter the alpha character of the desired option. These options may be documents constituting leaves of the tree, or may be identifiers of lower level display pages of the menu. In a variant the prompt is alternatively or additionally an audio message.

In a variant the customer can make the selection by clicking on the desired option, and the Information Application running in the PCC will automatically generate the Next Item message including the identifier of the selected option, which in this case need not be included in the display since the customer does not manually enter this character.

Examples of information sources are electronic newspaper, home shopping, Open University, reference library, University course material, seminar papers, conference papers, company information, travel information, insurance, weather, teletext, entertainment programme details, search engine, rail/bus timetables, and the like.

As used herein, the term information item refers both to documents linked in a menu structure and to a single non-linked document.

Figure 2:
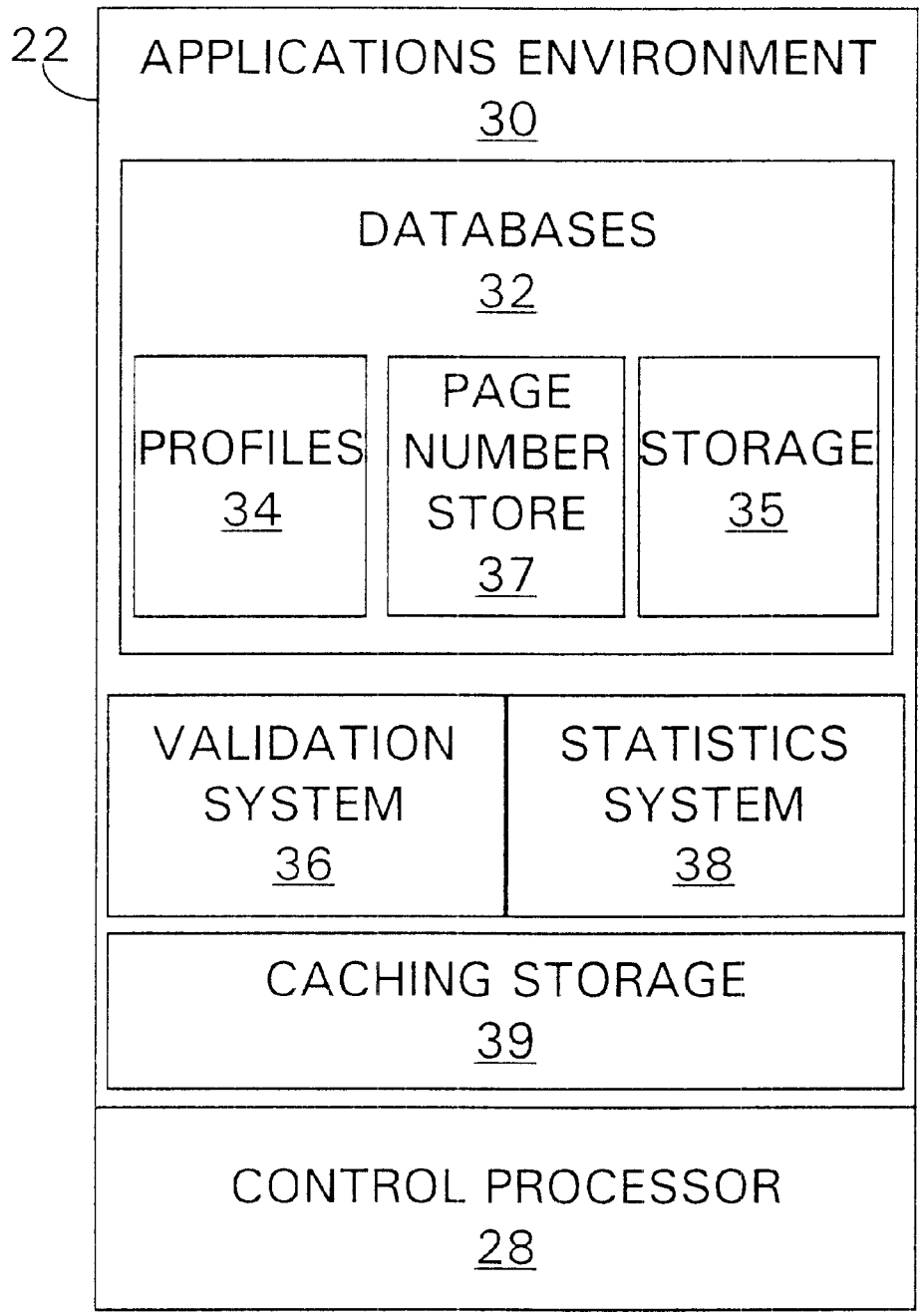
FIG. 2 is a schematic diagram of part of the service node of the network of FIG. 1.

As shown in FIG. 2, the SN 22 comprises inter alia a control processor 28, constituting a control means of the present invention, and an applications environment 30 for running a number of applications, each application being associated with a respective database 32. In accordance with the present invention, one of the applications is an Information Application, and its associated information database 32 contains respective customer information profiles 34. A customer information profile 34 contains:

(a) a list of the particular information item identifiers which are specified in an access contract between the customer and the IN operator and for which the customer has agreed to pay the IN operator access charges (the ISPs have respective separate contracts with the IN operator, and the customer deals with only the network operator as agent for the ISPs);
(b) the customer's identity (ID), also referred to as a user identity;
(c) the customer's current password; and
(d) identifiers for any other information items which are currently available for no charge.

The information database 32 also contains in a store 35 a list of all the information item identifiers in association with respective identifiers of the actual sources which store the information items. In a variant, instead of such a separate list of all the information item identifiers in association with their respective actual source identifiers, the profiles store with each information item identifier the respective actual source identifier.

Herein, the terms "identifier of" and "identity of" are used synonymous and interchangeably.

The SN 22 also includes a validation system 36, shown separately but constituted by a validation application of the applications environment 30, and a statistics system 38, also shown separately but constituted by a statistics application of the applications environment 30, and a plurality of page number stores 37, shown separately but constituted by a part of the database 32.

The statistics system 38 continually monitors all the customer profiles and periodically produces a ranked list of the information items in order of popularity, i.e. ranked by the number of profiles that contain each information item. The SN 22 comprises local caching storage 39, and subject to the amount of caching storage available, the SN 22 accesses the remote information service provider databases 26, retrieves in rank order the information items of the ranked list, and stores them in the caching storage 39. In this way, it is likely that a customer's selected information item can be retrieved immediately from the caching storage 39, and real time accessing of the remote databases avoided in the majority of cases. In variants the SN 22 retrieves and caches, say, only the top ten items of the ranked list, or some other such limit, or the statistics system 38 itself generates a limited ranked list whereby the retrieving/caching function of the control processor 24 need not know the numerical size of the ranked list but merely goes down the list until there are no more entries.

Where an information item has been cached, the associated actual source identifier in storage 35 will be that of the caching storage 39, but otherwise the associated actual source identifier will be that of the relevant ISP 24.

Figure 3:
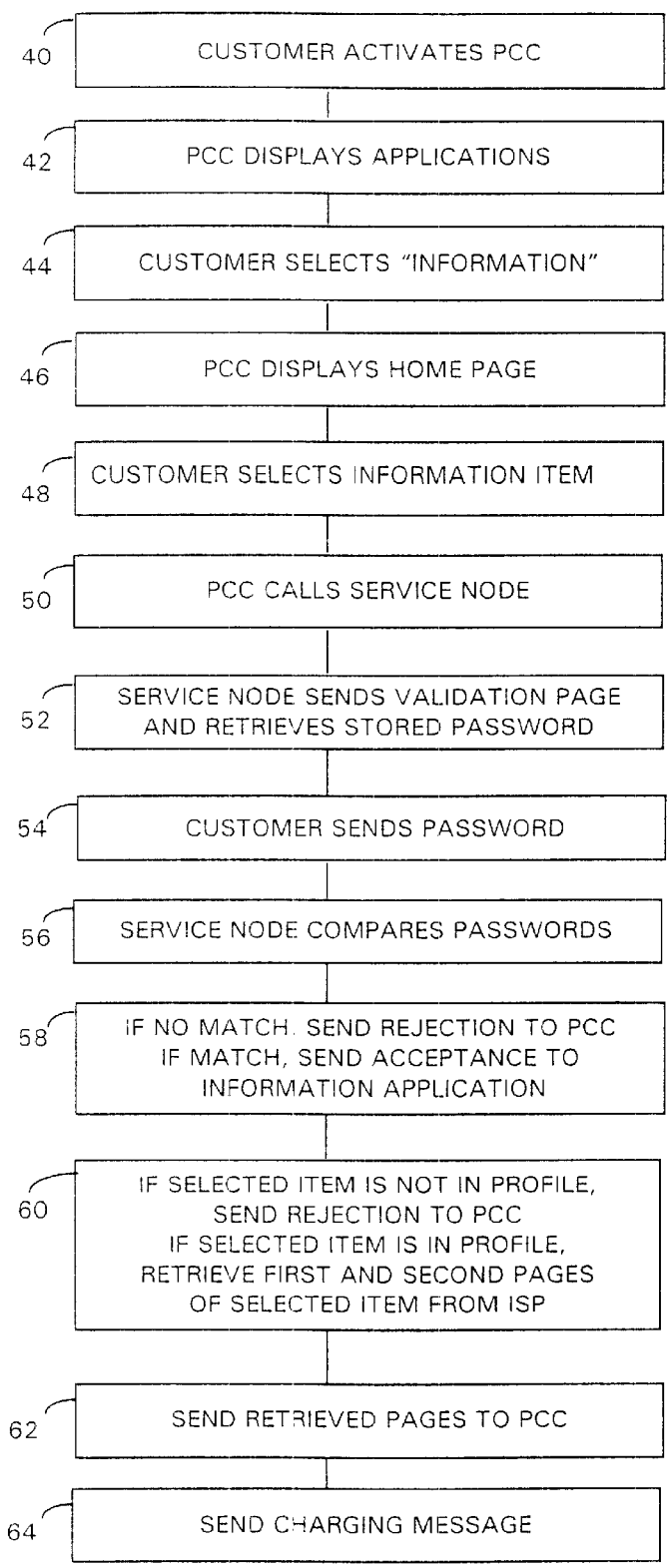
FIG. 3 is a flow diagram of a method of the present invention.

The operation of the information service of the network 10 will now be described with reference to the flow diagram of FIG. 3.

The customer begins by activating his PCC (step 40). The control program of the PCC produces an initial display on the screen of the PCC indicating, by icons or text, the applications which are available for use by the customer (step 421).

The customer selects "Information" by double-clicking or any other conventional means (step 44), and an Information Application, also known as a Client Application, starts processing. In a variant the customer uses a dedicated information device, also having a communications facility, which runs only the Information Application.

The Application retrieves the customer's information "home page" from the PCC's internal memory and displays it (step 46). This home page comprises a list of information items from which the customer will make a selection (by a double click on the selected item). In this example, the list comprises a number of advertisements (from the service node operator and/or the ISPs 24), the titles of electronic publications for which the customer has paid a subscription (e.g. Reuters Information Service), the titles of electronic publications which are available for no charge and for which the customer has registered for access, the share price of the service node operator, "Other Information Sources", "Your Profile", "Help", and "Messages". In variants, Instead of the home page being stored in memory, e.g. ROM, in the PCC, it is stored on a separate data carrier in the form of, e.g. a disk or a smart card, and read from the carrier by the PCC.

Suppose that the customer selects the information item "The Times" (step 48). The PCC responds by making a call requesting "Information Service". The call set-up message contains the message components: customer's ID, the identity of requested service, i.e. "Information Service", and the identity of the selected information item.

This call is routed through the appropriate cellular network (not shown), and the PSTN (not shown), to the intelligent network 10. When the call arrives at an SSP 12, a lookup table is used to determine the subsequent routing of the call, and the SSP 12 thus routes the call to one of the SNs 22 (step 50). In variants the intelligent network 10 additionally comprises one or more SNs which do not run the Information Application in their Application Environment and, in this case, the lookup table contains appropriate entries so that the SSP 12 routes such calls only to an SN which does run the Information Application.

In variants the PCC makes the call via a landline instead of a cellular radio network, which may be a Transmission Control Protocol/Internet Protocol (TCP/IP) transmission medium.

In response to receipt of the call set-up message, the SN 22, under control of its Information Application, extracts the customer's ID and uses it to access the customer's profile in the information database 28, from which the customer's password is read and put into a temporary store (not shown) of the validation system 36. At the same time, the validation system 36 is commanded to send a validation page to the customer requesting entry of the customer's password (step 52).

The customer enters his password in the appropriate field of the validation page and presses the transmit button of the PCC (step 54). In some variants the password is stored in the PCC's memory or on the abovementioned data carrier and is automatically read and transmitted on receipt of the validation page. In other variants, upon activation the PCC displays a logon screen for the customer to enter his ID and password, and then sends this information, the password having been encrypted by the PCC, to the SN 22 for initial logon. Alternatively, the PCC does not send the logon information in a separate message, but holds this until the customer has made a selction from the home page, and then sends a single message containing the logon information with the customer's selection.

The validation system 36 receives the password entered by the customer and compares it (step 56) with the password in its temporary store. Depending upon the result (step 58), if there is no match, the validation system 36 sends a rejection message to the customer's PCC for display, but if the passwords match, an acceptance message is sent to the Information Application, which now proceeds to check (step 60) whether the received selected information item identity, i.e. "The Times", is contained in the customer's profile.

In this example the customer's home page stored in the PCC will have been transmitted to the PCC by the SN 22 in a previous communication under control of the Information Application, and the SN 22 will at that time have checked that all the information items of the home page are also contained in the customer's profile in the database 28. The check in step 56 is therefore to ensure that the customer cannot gain access to information sources which he has not subscribed to, by tampering with his PCC and adding an unauthorised information item to his home page.

In step 60, if the selected information item is not in the customer's profile, the SN 22 sends a rejection message to the customer's PCC for display, but if the selected information item is in the customer's profile, then the SN 22 retrieves the first and second pages of the information item from the caching storage 39, if the item is held in the caching storage, or sends an access message to the corresponding ISP 24 to retrieve these pages of the information item from the associated database 26. The profile contains an indication as to whether the selected item is held in the caching storage, together with the storage address, if it is so held.

The SN 22 then transmits the first and second pages to the customer's PCC for display (step 62), associates the information item identity with one of the page number stores 37, resets it and then increments it by one (to indicate that the first page has the status of current displayed page), and sends to a billing system (not shown) a charging message containing the customer's ID and the current charge for the information item (step 64).

It will be appreciated that, as far the SN 22 is concerned, the content (n) of the page number store 37 is indicative that the nth page has the status of being the current displayed page. However, in practice the customer's PCC may not be actually displaying that page, for example the PCC may have gone into a standby mode in which the screen display is turned off, and the SN 22 may not be aware of the condition of the customer's PCC.

The PCC has a caching storage and a caching storage manager (not shown separately). The caching storage has three locations (numbered one to three) for storing three pages, and its manager has a twelve location circular memory (numbered one to twelve) for storing respective pointers to the caching storage location where pages are stored, and the respective source addresses of the pages. Locations one and seven of the circular memory permanently contain the identity of the caching storage location one, locations three and nine of the circular memory permanently contain the identity of the caching storage location two, and locations five and eleven of the circular memory permanently contain the identity of the caching storage location three.

The PCC receives the first two pages, extracts their source addresses, and the Next Page (i.e. the third page) source address contained in the second page, and stores them as follows:

the first page in location one of the caching storage, and the source address of the first page in location two of the circular memory;
the second page in location two of the caching storage, and the source address of
the second page in location four of the circular memory;
the source address of the third page in location six of the circular memory.

The caching storage manager also has:

(i) a Next Page pointer arrangement for holding first and second pointers, the first Next Page pointer initially points to location three of the circular memory, which, as stated above, contains the identity of location two of the caching storage, and the second Next Page pointer initially points to location six of the circular memory, which, as stated above, contains the source address of the third page; and
(ii) a Previous Page pointer arrangement, for holding first and second pointers, the first Previous Page pointer initially points to location eleven of the circular memory, which, as stated above, contains the identity of location three of the caching storage (which is Initially empty), and the second Previous Page pointer initially points to location ten of the circular memory, which is initially empty but which will contain the source address of a previous page to be requested from the SN 22, as described below.

The PCC now proceeds to display the first page. The display comprises a title bar at the top of the screen, an options bar at the bottom of the screen, and an information section between these two bars. The options bar contains buttons for Quit, Next Page, Previous Page, Go To Page, and Search.

The options buttons Next Page and Previous Page are soft programmed to use the Next Page and Previous Page pointers, as follows. Upon first activation of the Next Page button the PCC retrieves the second page from location two in the caching storage for display, and retrieves the address (i.e. of the third page) in location six of the circular memory and sends it in a message to the SN 22. Finally, the manager increments all the pointer values of the Next Page and Previous Page pointers by two, i.e. the Next Page pointers become five and eight, respectively, and the Previous Page pointers become one and twelve, respectively.

The SN 22 responds to receipt of the message to update its page number store 37 to two, and to retrieve the requested third page and send it to the PCC.

Upon receipt of the third page from SN 22, the PCC extracts the Next Page (i.e. of the fourth page) source address and stores it in location eight of the circular memory, and stores the third page in location three of the caching storage.

Suppose that the customer again activates the Next Page button. The third page is retrieved from location three of the caching storage and displayed, the source address is retrieved from location eight of the circular memory and sent to the SN 22, and the pointers are incremented. The SN 22 increments its page number store 37, retrieves the requested fourth page, and sends it to the PCC.

Upon receipt of the fourth page from the SN 22, the PCC extracts the Next Page (i.e. the fifth page) address of the page and stores it in location ten of the circular memory, and stores the fourth page in location one of the caching storage, overwriting the first page. It will be understood that the Previous Page pointers are now three and two, respectively, so that if the customer were to activate the Previous Page button, the PCC would retrieve and display the second page, as directed by the content of location three of the circular memory, and send the SN 22 a message containing the source address from location two of the circular memory, i.e. that of the first page.

If the customer selects Quit, the PCC control program displays the home page. If the customer makes a selection from any of the other options buttons, the identity of the selected options button is sent by the PCC in a signalling message to the SN 22 which responds accordingly.

In a variant instead of the PCC sending the source address of the requested page, it sends the page number of the page that is required. For example, if the third page is being displayed, then activation of the Next Page button will result in a request for the fifth page, and, alternatively, activation of the Previous Page button will result in a request for the first page.

In another variant instead of the PCC sending the source address of the requested page, it sends just a next (or previous) page request message, and the SN 22 calculates the number of the requested page from the content of its page number store. In this variant, if the customer selects the options button Next Page, the PCC displays the second page from its caching storage, and transmits the Next Page request to the SN 22, which responds by sending the third page. The PCC stores the received third page in the caching storage in association with the data already stored therein. The customer thus has immediate access from the second page to either the third page (Next Page) or the first page (Previous Page). The SN 22 keeps track of which page has the status of current displayed page, i.e. the page which in normal use the customer's PCC currently has on its display, by means of the respective page number store 37 currently associated with the information item, and therefore knows that, unless this current page is either the first or the last page of the information item, the PCC will be storing the adjacent pages in its caching storage. The control processor 28 increments the associated page number store 37 for each Next Page request that it receives from the customer and decrements the associated page number store 37 for each Previous Page request that it receives from the customer. Thus, if the page number store 37 contains n (i.e. page n has the status of current displayed page), on receipt of a Next Page request, the SN 22 sends page (n+2) and increments the page number store 37 to n+1, and on receipt of a Previous Page request, the SN 22 sends page (n−2) and decrements the page number store 37 to n−1. In a variant the page number store 37 is incremented, or decremented, before the SN 22 arranges for the appropriate next, or previous, page to be sent, and in this case the control processor 28 calculates the required page by adding, or subtracting, one from the current value of the page number store 37.

In a variant the SN 22 sends to the PCC only the first page of the selected information item, and the PCC holds only one page in its caching storage. In this variant on sending the first page of the item the control processor 28 merely resets the page number store 37 to zero but does not increment it to one. In this case, upon receipt of the first Next Page request the page number store 37 will be incremented (n=1), and thus the SN 22 will send the second page, i.e. page (n+1).

In another variant the call setup message includes the identity of the delivery medium required by the customer. For example, the customer can request that the selected item be delivered in speech, and in this case the SN 22 responds to the request by sending the retrieved pages to a text-to-speech converter (not shown) and sending the generated speech output to the customer.

If the customer has a subscription agreement under which, for a single daily charge, he has unlimited access to certain information items (herein referred to as subscription information items), the SN 22 will recognise second and subsequent accesses for a subscription information item and bearing the same date as the first access, and not send to the billing system any charging messages in respect of these accesses. In a variant, the SN 22 sends a charging message to the billing system for each access to a subscription information item in any one day, but the billing system is arranged to enter a zero charge in the customer's account for all accesses other than the first access.

In a variant the PCC does not store a downloaded home page. In this case, after activating his PCC the customer dials a service number. The call is routed to the SN 22, which commands the validation system 36 to send a user authorisation page requesting the customer to enter his personal identification number (PIN). If the correct PIN is entered, the validation system 36 informs the Information Application, which then accesses its information database to retrieve the customer's profile, and sends this to the customer's PCC for inclusion in the displayed home page. Upon receipt of the customer's selection, the SN 22 immediately sends the first two pages of the selected information item (or first page thereof if the PCC is not arranged to cache only one page), without checking whether the selected item is contained in the profile.

When the customer selects the "Your Profile" item, this causes the PCC to send a respective message to the SN 22, which responds by retrieving the respective profile from the information database 32 and sending the data to the PCC, which then generates and displays the profile page. This page contains a title containing the customer's name, e.g. "John Smith's Profile", and, below this, a heading "You currently subscribe to: " followed by a list of the information sources that the customer can immediately access, together with the cost of access, e.g.

| THE SUN | (10 p/day) |
| GEOGRAPHICAL MAGAZINE | (cost in pence) |
| OPEN UNIVERSITY | (cost in pence) |

Below this list are buttons for Add, Remove, Usage, and Options.

Clicking on the Add button causes the PCC to send a respective message to the SN 22, which responds by returning to the PCC a list of all available information sources. The PCC displays these in a page including an Add button for the customer to add to his profile, items selected from this list.

Clicking on the Remove button when one or more of the items of the customer's profile are highlighted (selected) causes the PCC to send a respective message to the SN 22, which responds by deleting the selected items from the profile 34 in the information database 32.

Clicking on the Usage button causes the PCC to send a respective message to the SN 22, which responds by returning to the PCC the customer's billing information in the current billing period, together with the customer's payment and other details. The PCC displays this information (individual access charges and profile charges) in a page including a Change button for the customer to amend any of the payment and other details.

What is claimed is:

1. A node for providing an information service in an intelligent communications network, the node comprising:

data storage means for storing customer identities, respective customer-associated lists of identities of information items (hereinafter referred to as items) for which the respective associated customer has access rights, and identities of item-associated information sources which store the respective items;

means for accessing the data storage means;

signalling means for receiving and transmitting messages;

means for reading an access request message received by said signalling means and providing at least a customer identity extracted therefrom; and control means responsive
- (a) to the provision by said reading means of a customer identity not accompanied by an item identity to retrieve, via said accessing means, a customer-associated list corresponding to said customer identity and to send a message including said retrieved list to the customer via said signalling means, and
- (b) to the provision by said reading means of an item identity received in a reply message from the customer to retrieve, via said accessing means, the corresponding information source identity, to retrieve the requested item from the corresponding information source, and to send a message including at least the first page of the retrieved item to the customer via said signalling means.

2. A node as claimed in claim 1, wherein said identities of said item-associated information sources are stored in a list, and the control means is arranged to ascertain the identity of the information source associated with said item identity by accessing said list of item-associated information sources in accordance with the received item identity.

3. A node as claimed in claim 1, and further comprising caching storage, and wherein said control means is arranged to write a retrieved requested item into the caching storage, and for each item so written into the caching storage to replace the original stored identity of the item-associated information source from which the requested item was retrieved with an identity corresponding to the caching storage.

4. A node as claimed in claim 3, further comprising means for counting the respective numbers of occurrences of the item identities in said respective customer-associated lists and to rank the item identities accordingly, and wherein said control means is arranged to retrieve, in the rank order of the item identities, corresponding items from their respective information sources and to write the retrieved items into said caching storage.

5. A node as claimed in claim 1, wherein the control means is arranged to send the first two pages of the retrieved item to the calling terminal in response to receipt of said access request message.

6. A node as claimed in claim 5, wherein the control means is responsive to received Next Page and Previous Page request messages in respect of the retrieved item to keep track of the number, n, of the page thereof which has current display status, and upon receipt of a Next Page request, or a Previous Page request, in respect of the retrieved item to send page n+2, or page n−2, respectively.

7. A node for providing an information service in an intelligent communications network, the node comprising:

data storage means for storing customer identities, respective customer-associated lists of identities of information items (hereinafter referred to as items) for which the respective associated customer has access rights, and identities of item-associated information sources which store the respective items;

means for accessing the data storage means;

signalling means for receiving and transmitting messages;

means for reading a message received by said signalling means and providing at least a customer identity and an item identity extracted therefrom;

comparison means; and control means responsive
- (a) to the provision by said reading means of a customer identity and an item identity received in an access request message from a customer to retrieve, via said accessing means, a customer-associated list corresponding to said customer identity and to provide to said comparison means said item identity and the retrieved list, and
- (b) to an indication provided by the comparison means of a match between said received item identity and a member of the retrieved list to retrieve, via said accessing means, the corresponding information source identity, to retrieve the requested item from the corresponding information source, and to send a message including at least the first page of the retrieved item to the customer via said signalling means.

8. A method of operating an intelligent communications network to provide a network-based information service, the method comprising the steps of:
- (a) storing customer identities, respective customer-associated lists of identities of information items (hereinafter referred to as items) for which the respective associated customer has access rights, and identities of item-associated information sources from which the respective items can be retrieved;
- (b) receiving at the network a message requesting access to the information service and comprising at least a customer identity;
- (c) reading the contents of the received message;
- (d) retrieving from storage the list of information item identities associated with the received customer identity;

if no item identity is received in step (b),
- (e)(i) sending said list to the customer; and (ii) reading an item identity from a further message received from the customer;

or, on the other hand, if an item identity is received in step (b),
- (f) ascertaining whether or not that received item identity is in said list;

and for such item identity received in step (b), if it is ascertained in step (f) that said received item identity is in said list, or, alternatively, for the item identity received in step (e)(ii), as the case may be,
- (g) ascertaining the identity of the information source associated with that received item identity;
- (h) retrieving the requested item from that information source; and
- (i) sending at least the first page of the retrieved item to the customer.

9. A method as claimed in claim 8, wherein step (a) comprises storing said identities of said item-associated information sources in a list, and wherein step (i) is performed by accessing said list of item-associated information sources in accordance with the received item identity.

10. A method as claimed in claim 8, including the further steps of:
- (j) writing a retrieved requested item into a caching storage, and, for each item so written into the caching storage, (k) replacing the original stored identity of the item-associated information source from which the requested item was retrieved with the caching storage identity.

11. A method as claimed in claim 10, including the steps of:
   (l) counting the respective occurrences of the item identities in said respective customer-associated lists;
   (m) ranking the item identities accordingly;
   (n) retrieving, in the rank order of the item identities, corresponding items from their respective information sources; and
   (o) writing the retrieved items into the caching storage.

12. A method as claimed in claim 8, wherein step (i) comprises sending the first two pages of the retrieved item to the customer.

13. A method as claimed in claim 12, including the steps of:
   (p) keeping track of the number, n, of the page thereof which has current display status at the calling terminal; and
   (q) upon receipt of a Next Page, or a Previous Page, request in respect of the retrieved item, sending page n+2, or page n−2, respectively.

14. A node for providing an information service in a communications network, the node comprising:
   data storage means for storing customer identities, respective customer-associated lists of identities of information items, hereinafter referred to as items, for which the respective associated customer has access rights, and identities of item-associated information sources which store the respective items;
   means for accessing the data storage means;
   signalling means for receiving and transmitting messages;
   means for reading an access request message received by said signalling means and providing at least a customer identity extracted therefrom; and
   control means responsive
      to the provision by said reading means of a customer identity not accompanied by an item identity to retrieve, via said accessing means, a customer-associated list corresponding to said customer identity and to send a message including said retrieved list to the customer via said signalling means, and
      to the provision by said reading means of an item identity received in a reply message from the customer to retrieve, via said accessing means, the corresponding information source identity, to retrieve the requested item from the corresponding information source, and to send a message including at least the first page of the retrieved item to the customer via said signalling means.

15. A node as in claim 14 wherein said identities of said item-associated information sources are stored in a list, and the control means is arranged to ascertain the identity of the information source associated with said item identity by accessing said list of item-associated information sources in accordance with the received item identity.

16. A node as in claim 14 and further comprising caching storage, and wherein said control means is arranged to write a retrieved requested item into the caching storage, and for each item so written into the caching storage to replace the original stored identity of the item-associated information source from which the requested item was retrieved with an identity corresponding to the caching storage.

17. A node as in claim 16 further comprising means for counting the respective numbers of occurrences of the item identities in said respective customer-associated lists and to rank the item identities accordingly, and wherein said control means is arranged to retrieve, in the rank order of the item identifies, corresponding items from their respective information sources and to write the retrieved items into said caching storage.

18. A node as in claim 14 wherein the control means is arranged to send the first two pages of the retrieved item to the calling terminal in response to receipt of said access request message.

19. A node as in claim 18 wherein the control means is responsive to received Next Page and Previous Page request messages in respect of the retrieved item to keep track of the number, n, of the page thereof which has current display status, and upon receipt of a Next Page request, or a Previous Page request, in respect of the retrieved item to send page n+2, or page n−2, respectively.

20. A node for providing an information service in a communications network, the node comprising:
   data storage means for storing customer identities, respective customer-associated lists of identities of information items, hereinafter referred to as items, for which the respective associated customer has access rights, and identities of item-associated information sources which store the respective items;
   means for accessing the data storage means;
   signalling means for receiving and transmitting messages;
   means for reading a message received by said signalling means and providing at least a customer identity and an item identity extracted therefrom;
   comparison means; and
   control means responsive
      to the provision by said reading means of a customer identity and an item identity received in an access request message from a customer to retrieve, via said accessing means, a customer-associated list corresponding to said customer identity and to provide to said comparison means said item identity and the retrieved list, and
      to an indication provided by the comparison means of a match between said received item identity and a member of the retrieved list to retrieve, via said accessing means, the corresponding information source identity, to retrieve the requested item from the corresponding information source, and to send a message including at least the first page of the retrieved item to the customer via said signalling means.

21. A method of operating a communications network to provide a network-based information service, the method comprising the following steps:
   step a—storing customer identities, respective customer-associated lists of identities of information items, hereinafter referred to as items, for which the respective associated customer has access rights, and identities of item-associated information sources from which the respective items can be retrieved;
   step b—receiving at the network a message requesting access to the information service and comprising at least a customer identity;
   step c—reading the contents of the received message;
   step d—retrieving from storage the list of information item identities associated with the received customer identity;

if no item identity is received in step b,
- step e1—sending said list to the customer; and
- step e2—reading an item identity from a further message received from the customer;

or, on the other hand, if an item identity is received in step b,
- step f—ascertaining whether or not that received item identity is in said list;

and for such item identity received in step b, if it is ascertained in step f that said received item identity is in said list, or, alternatively, for the item identity received in step e2, as the case may be,
- step g—ascertaining the identity of the information source associated with that received item identity;
- step h—retrieving the requested item from that information source; and
- step i—sending at least the first page of the retrieved item to the customer.

22. A method as in claim 21 wherein step a comprises storing said identities of said item-associated information sources in a list, and wherein step i is performed by accessing said list of item-associated information sources in accordance with the received item identity.

23. A method as in claim 21 including the further following steps:
- step j—writing a retrieved requested item into a caching storage, and, for each item so written into the caching storage,
- step k—replacing the original stored identity of the item-associated information source from which the requested item was retrieved with the caching storage identity.

24. A method as in claim 23 including the further following steps:
- step l—counting the respective occurrences of the item identities in said respective customer-associated lists;
- step m—ranking the item identities accordingly;
- step n—retrieving, in the rank order of the item identities, corresponding items from their respective information sources; and
- step o—writing the retrieved items into the caching storage.

25. A method as in claim 21 wherein step i comprises sending the first two pages of the retrieved item to the customer.

26. A method as in claim 25 including the further following steps:
- step p—keeping track of the number, n, of the page thereof which has current display status at the terminal; and
- step q—upon receipt of a Next Page, or a Previous Page, request in respect of the retrieved item, sending pages n+2, or page n−2, respectively.

27. A node for providing an information service in a communications network, the node comprising:
- data storage for storing customer identities, respective customer-associated lists of aliases of documents for which the respective associated customer has access rights, and identities of document-associated information sources which store the respective documents;
- a processor for accessing the data storage;
- a signaller for receiving and transmitting messages;
- a reader for reading a message received by said signaller and providing at least a customer identity and an alias for a document extracted therefrom;
- a comparator; and
- a controller responsive
  - to the provision by said reader of a customer identity and an alias for a document received in an access request message from a customer to retrieve, via said processor, a customer-associated list corresponding to said customer identity and to provide said comparator said alias and the retrieved list, and
  - to an indication provided by the comparator of a match between said received alias and a member of the retrieved list to retrieve, via said processor, the corresponding information source identity, to retrieve the requested document from the corresponding information source, and to send a message including at least the first page of the retrieved document to the customer via said signaller.

* * * * *